United States Patent
Belz et al.

(10) Patent No.: US 12,528,494 B2
(45) Date of Patent: Jan. 20, 2026

(54) METHOD FOR INTERACTION WITH OCCUPANTS OF A MOTOR VEHICLE

(71) Applicant: AUDI AG, Ingolstadt (DE)

(72) Inventors: Karsten Belz, Ingolstadt (DE); Steffen Ross, Wettstetten (DE)

(73) Assignee: AUDI AG, Ingolstadt (DE)

( * ) Notice: Subject to any disclaimer, the term of this patent is extended or adjusted under 35 U.S.C. 154(b) by 49 days.

(21) Appl. No.: 18/618,973

(22) Filed: Mar. 27, 2024

(65) Prior Publication Data

US 2024/0367668 A1    Nov. 7, 2024

(30) Foreign Application Priority Data

May 5, 2023    (DE) .................. 102023111726.2

(51) Int. Cl.
| | |
|---|---|
| *B60Q 1/00* | (2006.01) |
| *B60W 50/14* | (2020.01) |
| *G06V 10/24* | (2022.01) |
| *G06V 20/59* | (2022.01) |
| *G06V 40/10* | (2022.01) |

(52) U.S. Cl.
CPC ............ *B60W 50/14* (2013.01); *G06V 10/24* (2022.01); *G06V 20/593* (2022.01); *G06V 40/10* (2022.01); *B60W 2050/146* (2013.01); *B60W 2420/403* (2013.01); *B60W 2540/215* (2020.02); *B60W 2540/227* (2020.02); *B60W 2556/45* (2020.02)

(58) Field of Classification Search
CPC ........... B60W 50/14; B60W 2050/146; B60W 2420/403; B60W 2540/215; B60W 2540/227; B60W 2556/45; G06V 10/24; G06V 20/593; G06V 40/10; G06V 20/59; B60K 35/29; B60K 35/10; B60K 2360/56; B60K 2360/589; B60K 2360/592; H04N 7/185
USPC ................... 340/425.5, 426.1, 439, 435, 436
See application file for complete search history.

(56) References Cited

U.S. PATENT DOCUMENTS

| | | | |
|---|---|---|---|
| 10,666,901 B1 | 5/2020 | Zhang et al. | |
| 12,120,159 B2* | 10/2024 | Nelson | ................... H04N 7/147 |
| 12,194,919 B2* | 1/2025 | Anderson | ............ G06V 10/764 |
| 12,354,420 B2* | 7/2025 | Burks | .................... H04W 4/029 |
| 2016/0205146 A1 | 7/2016 | Sugioka et al. | |
| 2024/0140463 A1* | 5/2024 | Suh | ........................ B60W 50/14 |
| 2024/0394389 A1* | 11/2024 | Wen | ........................ G06V 20/46 |

FOREIGN PATENT DOCUMENTS

| | | |
|---|---|---|
| DE | 102018215056 A1 | 3/2020 |
| KR | 1020190071282 A | 6/2019 |

OTHER PUBLICATIONS

Examination Report issued on Dec. 13, 2023, in corresponding German Application No. 102023111726.2, 14 pages.

* cited by examiner

*Primary Examiner* — Anh V La
(74) *Attorney, Agent, or Firm* — Maier & Maier, PLLC

(57) ABSTRACT

A method for interaction with occupants of a motor vehicle, including the steps of receiving a time specification from a location remote from the motor vehicle, detecting an image using an image detection device arranged on the motor vehicle within the time specification, sending the detected image to a location remote from the motor vehicle, receiving an image from a location remote from the motor vehicle, and displaying the received image on a display device in the motor vehicle.

20 Claims, 1 Drawing Sheet

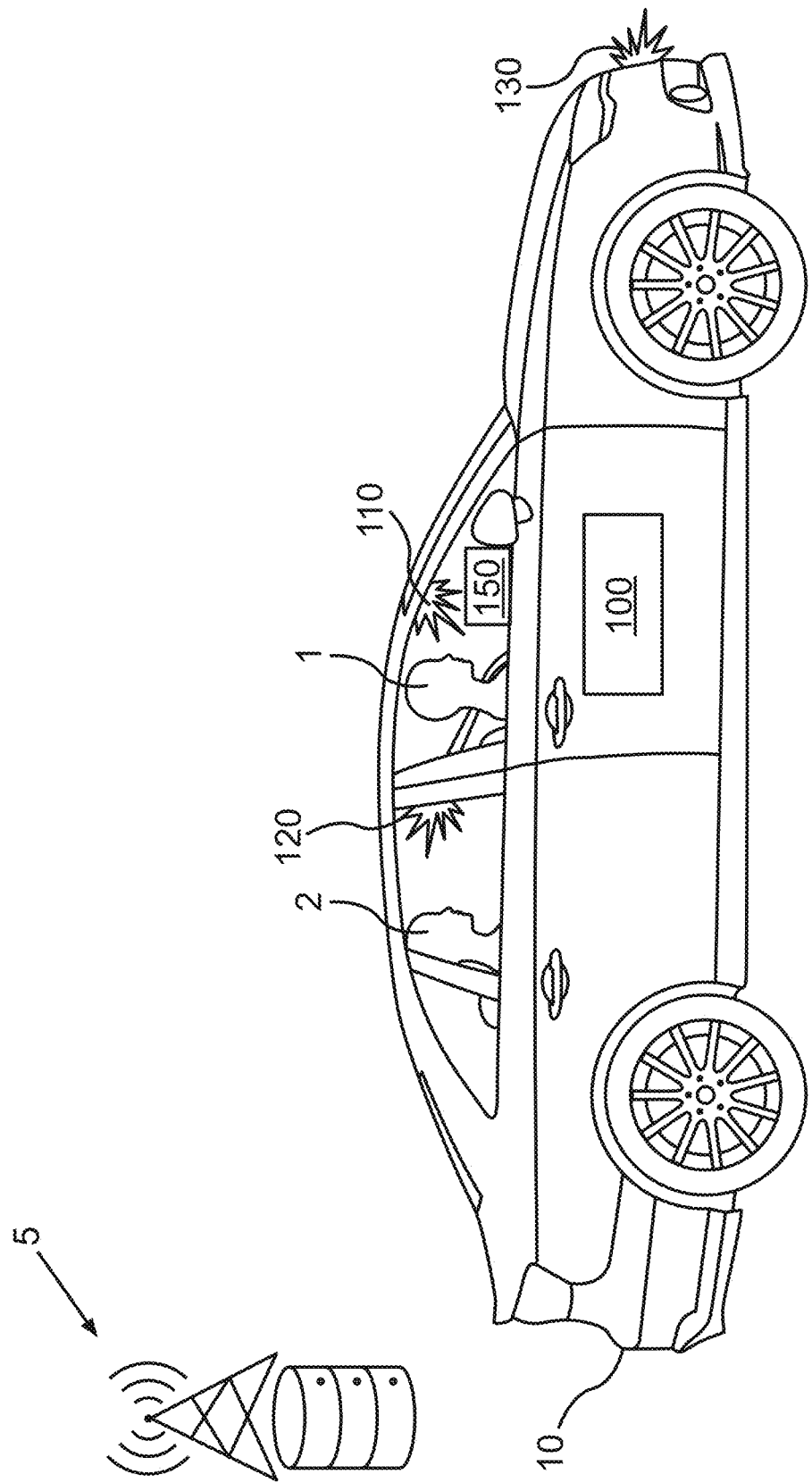

METHOD FOR INTERACTION WITH OCCUPANTS OF A MOTOR VEHICLE

FIELD

The present invention relates to a method for interaction with occupants of a motor vehicle and to a motor vehicle.

BACKGROUND

In conventional motor vehicles, the ability of the occupants and especially the driver to interact with people outside the vehicle is limited and is often restricted to the use of a smartphone, which, however, may be prohibited by law, especially for the driver.

SUMMARY

It is therefore an object of the present invention to provide an improved method for interaction with occupants of a motor vehicle. In particular, it is an object of the present invention to provide a method that simplifies interaction by the occupants, in particular the driver, and makes it compliant with the law.

According to a first aspect, a method for interaction with occupants of a motor vehicle is specified. The method includes the steps of receiving a time specification from a location remote from the motor vehicle, detecting an image by an image detection device arranged on the motor vehicle within the time specification, sending the detected image to a location remote from the motor vehicle, receiving an image from a location remote from the motor vehicle, and displaying the received image on a display device in the motor vehicle.

The method serves in particular to enable interaction between one or more occupants of a motor vehicle with other people, in particular people located outside the motor vehicle. In particular, the method is used to share snapshots of a motor vehicle travel with other people and to interact with them.

In the present case, an occupant means in particular a person who is or is at least temporarily in the interior, i.e. in the passenger compartment, of the motor vehicle. Typically, the occupants include at least the driver and optionally one or more passengers. The occupant can also be an animal, such as a pet, in particular a dog or a cat.

In a first step of the method, a time specification is received from a location remote from the motor vehicle.

The time specification is, for example, a fixed time or a countdown at which the method, in particular the steps described below, are carried out. For example, the time specification is a short time specification in minutes or seconds, for example 30 seconds, 60 seconds or 1 minute, 2 minutes or 5 minutes.

In particular, the time specification is a time frame within which the steps described below must be carried out at least partially, in particular completely. If individual steps of the method are only completed after the time specification frame, this can in particular lead to the termination of the method.

The time specification is received in particular once or multiple times a day, for example once in the morning and once in the afternoon.

The location remote from the motor vehicle is a location that is not identical to the motor vehicle and is distanced from it, such as a server, a data center or the like. In particular, this location, which is remote from the motor vehicle, is a central location that sends the time specification to multiple motor vehicles and, in particular, other additional devices, such as mobile devices, in particular smartphones, in particular those motor vehicles and/or devices that have previously agreed to or requested participation in the method according to the invention by previous registration.

In particular, the remote location or the computing units located there are designed to determine or set the time specification. In particular, the time specification is created or determined randomly once or multiple times a day within a predetermined frame and sent to the participating devices and/or motor vehicles in order to be received by them.

Receiving can take place in particular via wireless radio technologies or interfaces, such as mobile communications, in particular 3G, 4G, 5G, etc., Bluetooth, WiFi or Car2X communication.

In particular, this first step of receiving triggers the method according to the invention or is the first step.

In a further step of the method, an image is detected within the time specification by an image detection device arranged on the motor vehicle.

For this purpose, the motor vehicle has at least one image detection device which is designed to detect at least parts of the interior and/or the exterior of the motor vehicle in an image.

For example, the image detection device is arranged in or on the dashboard and is designed to detect the driver and/or front passenger seat or one or more occupants of the motor vehicle located thereon. Again, for example, the image detection device is arranged at the level of the B-column and is designed to detect the rear bench and/or rear seats or one or more occupants of the motor vehicle located thereon. Also, for example, the image detection device is arranged on a front part of the body of the motor vehicle, such as the front bumper, and is designed to detect an external space lying in front of the motor vehicle in the direction of travel. Again, for example, the image detection device is arranged on a rear part of the body of the motor vehicle, such as at a rear end, and is designed to detect an external space lying behind the motor vehicle in the direction of travel.

detecting an image can in particular include detecting multiple images, particularly one after the other. In particular, detecting an image can include detecting a video or video stream. In particular, the duration of the video can be limited and/or restricted, for example it can be shorter than 60 seconds, 30 seconds, 10 seconds or 5 seconds and/or until the time specification has expired.

detecting an image may include detecting a sound in addition to the video or alternatively thereto. This can be done in particular by a sound detection device or audio detection device arranged on the motor vehicle, in particular in the interior and/or the exterior of the motor vehicle. Both an ambient noise, such as an engine or wind noise, and a spoken text, such as a comment from one of the occupants of the motor vehicle, can be detected as sound, that is, as an audio signal or audio stream. In particular, the duration of the video can be limited and/or restricted, according to the video, for example it can be shorter than 60 seconds, 30 seconds, 10 seconds or 5 seconds and/or until the time specification has expired.

In a further step of the method, the detected image is sent to a location remote from the motor vehicle.

This may be the same remote location as previously described or a different remote location. For example, the time specification can be received from a central time server and the image can be sent to an image processing server that is different from and spatially distant from the time server.

Alternatively, the image is sent directly to one or more participating devices and/or motor vehicles, which here represent the remote location.

Sending the image can also include sending multiple detected images and/or sending a detected video or video stream. Alternatively or additionally, sending the image can also include sending a detected sound or audio stream.

The image can in particular also be sent within the time specification or alternatively within a short waiting period after the time specification has expired, for example within 5 seconds, 10 seconds, 30 seconds or 60 seconds after the time specification has expired.

In a first step of the method, a time specification is received from a location remote from the motor vehicle.

The received image can in particular also be an image detected or detected by another motor vehicle. Alternatively or additionally, the received image can also be an image that was detected with another device, such as a smartphone. In particular, the image is an image detected by participating devices and/or motor vehicles or a subset thereof, as will be described below. In particular, multiple images can also be received from different participating devices and/or motor vehicles.

This may be the same remote location as previously described or a different remote location. For example, the time specification can be received from a central time server and the detected image can be sent to an image processing server, by which the received image is also received. Alternatively, the image is received directly from one or more participating devices and/or motor vehicles, which here represent the remote location.

The received image can also include multiple images, a video stream and/or an audio stream, as previously described in connection with the detected image.

In particular, the image can be received or retrieved exclusively in response to the transmission of the detected image. However, if no image has been previously detected, especially not within the time specification, and/or if no image has been sent, no image will be received.

The image can in particular also be received within the time specification or alternatively within a short waiting period after the time specification has expired, for example within 5 seconds, 10 seconds, 30 seconds or 60 seconds after the time specification has expired.

In a further step of the method, the received image is displayed on a display device in the motor vehicle A display device can in particular be a display permanently installed in the motor vehicle, such as one or more screens of an entertainment and/or infotainment system and/or a head-up display. Alternatively or additionally, the display device can also be a device located in the motor vehicle, such as a smartphone, which is in particular coupled to the motor vehicle, for example wirelessly, in particular via Bluetooth. In particular, the received image can be displayed on multiple display devices, such as all entertainment screens, as well as the paired smartphones.

The previously received time specification can also be displayed on one of these display devices, either the same or a different one. Alternatively or additionally, the time specification can also be output as an audio signal, for example via one or more loudspeakers installed in the motor vehicle and/or on a smartphone coupled to the motor vehicle.

If the received image includes an audio stream, this can also be played back on one or more of the speakers and/or the coupled smartphone, in particular at the same time as the image or images or the video stream.

The image can in particular also be received within the time specification or alternatively within a short waiting period after the time specification has expired, for example within 5 seconds, 10 seconds, 30 seconds or 60 seconds after the time specification has expired.

The method is in particular a computer-implemented method, some or all of the steps of which can be performed or carried out using a processor device.

The method according to the invention enables a particularly simple and legally compliant interaction by the occupants, in particular the driver, with other people who are not in the motor vehicle.

According to a further development, the method further comprises receiving a user input for selecting one of a plurality of image detection devices arranged on the motor vehicle, wherein the image is detected by the selected image detection device.

For this purpose, the motor vehicle includes not just one, but multiple image detection devices in the interior and/or exterior, as described above.

A user request can first be displayed, in response to which the user input is received or detected. In this case, a user is in particular an occupant of the motor vehicle.

The user request can be displayed on one or more previously described display devices and/or on paired smartphones.

The user input may also be displayed on one or more previously described display devices, in particular those designed to detect touch input, such as a touch display, and/or paired smartphones, either the same on which the user request was displayed or different ones. Alternatively or additionally, the user input can be received on a button or a button in the interior of the motor vehicle.

Displaying the user request and/or receiving the user input can occur in particular before the one or more images are detected.

With the user input, an occupant can now select one or more of the multiple image detection devices in order to have one or more images detected by this or these. For example, an occupant can provide the detection of an image of the driver and one in the direction of travel of the motor vehicle but not one of the passenger.

Alternatively, one or more images can also be detected by each or all image detection devices located on the motor vehicle and then displayed to the occupant(s) for selection on a previously described display device in order to select one or more of the multiple detected images through user input.

In particular, the user request is displayed and/or the user input is received within the time specification.

This further development makes it possible to particularly personalize the images sent and, in particular, to influence the selection of the images, for example if one or more are shaky or do not correspond to what is perceived by of one or more occupants.

According to a further development, the method further comprises aligning an image region of the image detection device to be detected.

In the present case, aligning can include, for example, focusing and/or zooming, in particular zooming in and/or out into an image portion of one or more image detection devices. In the present case, alignment can also include pivoting, tilting or rotating one or more image detection devices.

The alignment can be done in response to user input, as described above. Alternatively or additionally, the alignment can take place based on a detected occupant position.

For example, a position of at least one occupant, for example the driver, in the motor vehicle can first be detected. This can be done, for example, via detection of seat occupancy, such as by a weight sensor in the seat. Alternatively or additionally, this can be done via an evaluation of audio recording devices that are arranged in the interior of the motor vehicle and spatially evaluate the interior noise. Again, for example, a position may be detected via user input as previously described, for example by selecting one or more displayed user requests.

It can therefore be panned and zoomed in on the face of an occupant, such as the driver, especially if they are speaking at the same time and this is detected as a sound. Alternatively or additionally, it is possible to focus on a specific point in the exterior of the motor vehicle that was selected by an occupant, such as a particularly beautiful landscape.

This further development makes it possible for the occupants to actively design the image portion. In particular, this enables particularly personal interaction.

According to a further development, the method further comprises detecting a text input, wherein sending the detected image includes sending the detected text.

detecting a text input can be displayed, for example, via a keyboard, in particular a soft keyboard, which is displayed on one or more display devices that are designed to detect touch input. Alternatively or additionally, text can be entered on a paired smartphone. In particular, the text input can also be detected via voice input, in particular a text2speech function, whereby spoken words are converted into written text.

This detected text input can then be sent along with the detected image. In particular, the detected text, can be added graphically, for example as a caption, to the one or more images and in particular to the video stream.

The text input is also detected in particular within the time specification.

This further development makes it possible to add contextual information or further information to the image and thus enable a particularly informative interaction.

According to a further development, the method further comprises detecting contact data of an occupant of the motor vehicle, wherein the detected image is sent in response to the detected contact data.

Contact data includes, for example, data from one or more people, such as a telephone number, a name and/or in particular a user name of one or more people, in particular those people who have registered to participate.

The contact data can in particular be stored in the motor vehicle, for example in an infotainment system. Alternatively or additionally, the contact data can also be stored in one or more paired smartphones of the occupants.

The contact details are assigned to at least one occupant of the motor vehicle, for example the driver who has personalized the infotainment system for himself, but relate to the information of a person different from him. In particular, the contact details concern one or more people who are not currently in the motor vehicle, but rather external people.

The detected image is sent depending on the detected contact data. For example, the image is only sent if there is any contact data in memory or can be detected. Again, for example, the image is sent to all of the detected contacts or at least a subset of them that is selected based on further criteria, as will be described below. Again, for example, the image is sent to the remote location together with the detected contact data, in particular exclusively the user name, so that it can then be forwarded from there to the contacts, or subsets thereof.

This further development enables particularly personal interaction. In particular, images can only be shared with participating users who are known to the person, for example through previous interactions.

According to a further development, the method further comprises detecting a position of the motor vehicle and sending the detected position to a location remote from the motor vehicle, wherein receiving a time specification and/or sending the detected image takes place in response to the detected position.

In the present case, detecting a position includes in particular the current position or the position at which the motor vehicle is located at the time the time specification is received. The position can be determined in particular via a location detection device, such as a GPS sensor, in particular using map or location data.

In the present case, a position means a location of the motor vehicle that is determined with sufficient precision, such as an address, in particular a street and house number and/or a postal code, and/or a coordinate. However, the position can also be less precise or include a larger uncertainty radius and, for example, include a district, an administrative district, a region, a federal state and/or a country. Of course, the less precise position can also be derived from the more precise one.

A position can also comprise further information, such as a direction of travel, a compass direction, a navigation destination and/or a route to a navigation destination.

Receiving the time specification and/or sending the detected image then takes place, in particular exclusively, depending on the detected position. Alternatively or additionally, the image can be received, in particular exclusively, depending on the detected position.

For example, only those motor vehicles that are at or near a specific position, in particular predetermined by the remote location, can take part in the process. For example, all motor vehicles that are located in a country, such as Germany, that are located in a federal state, such as Bavaria, that are within a radius of, for example, 1 km, 5 km, 10 km or 50 km around a city, such as Ingolstadt, which are located at or within a radius around a specific attraction, such as a point of interest (POI) and/or which are on the same street, in particular driving in the same direction and/or to the same destination, can participate to the method.

For this purpose, in particular before receiving the time specification and/or before receiving the image, the detected position can be provided to the remote location from which the time specification and/or the image is received.

Again, for example, the detected image can be sent to the remote location together with the detected position, so that a decision can be made at the remote location to whom which images detected by other participating motor vehicles and/or devices will be sent.

The position can be detected in particular within the time specification.

This further development enables spatially limited interaction. In particular, this promotes group dynamic interaction.

According to a further development, the method further comprises detecting a type of the motor vehicle and sending the detected type to a location remote from the motor vehicle, wherein receiving a time specification and/or sending the detected image takes place in response to the detected type.

In the present case, a type means a property of the motor vehicle that sufficiently determines it. This can be, for example, a brand, a model, a body shape, an engine, a type of drive, a type of fuel, an equipment variant and/or a performance of the motor vehicle. The type can in particular be stored in an infotainment system and/or read out by the same.

Receiving the time specification and/or sending the detected image then takes place, in particular exclusively, depending on the detected type. Alternatively or additionally, the image can be received, in particular exclusively, depending on the detected type.

For example, only those motor vehicles that are manufactured by a specific manufacturer, such as Audi, that comprise a specific model and body type, such as an A5 Cabrio, that include a specific form of drive, such as electric vehicles and/or hybrid electric vehicles, or that have a power which exceeds a certain power, such as 100 kW. can take part in the method.

For this purpose, in particular before receiving the time specification and/or before receiving the image, the detected type can be provided to the remote location from which the time specification and/or the image is received.

Again, for example, the detected image can be sent to the remote location together with the detected type, so that a decision can be made at the remote location to whom which images detected by other participating motor vehicles and/or devices will be sent.

The type can be detected in particular within the time specification.

This further development enables particularly personal interaction. In particular, it also facilitates a group dynamic interaction.

According to a further development, the method further comprises detecting whether the motor vehicle is in an autonomous driving mode, wherein the steps of the method are carried out in response to the fact that the motor vehicle is not in an autonomous driving mode.

In the present case, an autonomous driving mode comprises a driving mode of the motor vehicle in which it can drive autonomously, at least partially, in particular without control and/or intervention by the driver. For example, this mode can be an autonomous driving mode of Level 3 or higher, Level 4 or higher, or Level 5 or higher.

In response to the determination that the motor vehicle is in such an autonomous driving mode, individual steps of the method or the entire method are then not carried out. In this case, individual steps of the method or the entire method can be carried out exclusively on a participating device, such as a smartphone, the use of which by the driver while driving may be prohibited by legal regulations.

In other words, in this development, all steps of the method according to the invention described above and in the following are only carried out when the motor vehicle is not in an autonomous driving mode.

In particular, the method can only be initiated or started in response to the fact that the motor vehicle is not in an autonomous driving mode.

Further in particular, receiving a time specification from a location remote from the motor vehicle can only take place in response to the fact that the motor vehicle is not in an autonomous driving mode.

Likewise, in particular, detecting the image by an image detection device arranged on the motor vehicle within the time specification can only occur in response to the fact that the motor vehicle is not in an autonomous driving mode.

Again, in particular, sending the detected image to a location remote from the motor vehicle can only occur in response to the fact, that the motor vehicle is not in an autonomous driving mode.

Again, in particular, receiving an image from a location remote from the motor vehicle can only occur in response to the fact, that the motor vehicle is not in an autonomous driving mode.

Again, in particular, displaying the received image on a display device in the motor vehicle can only occur in response to the fact, that the motor vehicle is not in an autonomous driving mode.

Likewise, in particular, receiving a user input for selecting one of a plurality of image detection devices arranged on the motor vehicle can only take place in response to the fact that the motor vehicle is not in an autonomous driving mode.

Again, in particular, aligning an image region of the image detection device to be detected can only take place in response to the fact that the motor vehicle is not in an autonomous driving mode.

Likewise, in particular, detecting of an occupant position in the motor vehicle can only take place in response to the fact that the motor vehicle is not in an autonomous driving mode.

Again, in particular, detecting a text input can only take place in response to the fact that the motor vehicle is not in an autonomous driving mode.

Again, in particular, detecting contact data of an occupant of the motor vehicle can only occur in response to the fact that the motor vehicle not in an autonomous driving mode.

Again in particular, detecting a position of the motor vehicle and/or sending the detected position to a location remote from the motor vehicle can only take place in response to the fact that the motor vehicle is not in an autonomous driving mode.

In return, in particular, instead of one or more steps of the method being carried out when the motor vehicle is in an autonomous driving mode, a message can be displayed that refers to one or more paired smartphones.

This further development enables particularly legally compliant interaction.

For applications or usage situations that can arise in the method and which are not explicitly described here, it can be provided according to the method, that a fault message and/or a request for input of user feedback is output and/or a standard setting and/or a predetermined initial status are set.

According to a further aspect, a control device for a motor vehicle is provided. The control device can have a data processing device or a processor device which is configured to carry out an embodiment of the method according to the invention.

For this purpose, the processor device can have at least one microprocessor and/or at least one microcontroller and/or at least one FPGA (Field Programmable Gate Array) and/or at least one DSP (Digital Signal Processor). Furthermore, the processor device can have program code which is configured to carry out the embodiment of the method according to the invention when it is executed by the processor device. The program code can be stored in a data memory of the processor device. The processor device can be based, for example, on at least one circuit board and/or at least one SoC (System on Chip).

According to a further aspect, a motor vehicle is specified, comprising an image detection device that is designed to detect an image and a control device that is set up to carry out an embodiment of the method according to the invention.

The motor vehicle according to the invention is preferably designed as an automobile, in particular as a passenger car or truck, or as a passenger bus or motorcycle.

As a further solution, the invention also comprises a computer-readable storage medium, comprising program code which, when executed by a computer or a computer network, cause it to carry out an embodiment of the method according to the invention. The storage medium can be provided, for example, at least partially as a non-volatile data memory (such as a flash memory and/or as an SSD-solid state drive) and/or at least partially as a volatile data memory (such as a RAM-random access memory). The storage medium can be arranged in the computer or computer network. However, the storage medium can also be operated, for example, as a so-called app store server and/or cloud server on the Internet. A processor circuit having, for example, at least one microprocessor can be provided by the computer or computer network. The program code can be provided as binary code and/or as assembler code and/or as source code of a programming language (such as C) and/or as a program script (such as Python).

With regard to the embodiments of the control device, the motor vehicle and the storage medium and the associated advantages, reference is made to the previously described embodiments of the method and the associated advantages.

The invention also comprises the combinations of the features of the described embodiments. The invention therefore also comprises implementations that respectively have a combination of the features of multiple of the described embodiments, provided that the embodiments have not been described as mutually exclusive.

BRIEF DESCRIPTION OF THE FIGURES

Exemplary embodiments of the invention are described hereinafter. In particular:

FIG. 1 shows a schematic view of an embodiment of a control device and of a motor vehicle.

DETAILED DESCRIPTION

The exemplary embodiments explained hereinafter are preferred embodiments of the invention. In the exemplary embodiments, the described components of the embodiments each represent individual features of the invention to be considered independently of one another, which each also develop the invention independently of one another. Therefore, the disclosure is also intended to comprise combinations of the features of the embodiments other than those represented. Furthermore, the described embodiments can also be supplemented by further ones of the above-described features of the invention.

In the FIGURES, the same reference numerals respectively designate elements that have the same function.

FIG. 1 shows embodiments of a control device 100 and of a method for interaction with occupants 1, 2 of a motor vehicle 10.

The motor vehicle 10 includes a control device 100 and a first image detection device 110, which is arranged on an interior mirror of the motor vehicle 10, a second image detection device 120, which is arranged on a headrest of a front seat of the motor vehicle 10, and a third image detection device 130, on a front side of the Motor vehicle 10 is arranged. The first, second and third image detection devices 110, 120, 130 are designed to detect one or more images.

The motor vehicle 10 also includes a display device 150, which is shown here by way of example as a touch screen, and which is designed to display information and receive user input.

The control device 100 is designed to receive a time specification, such as a countdown, from a location 5 remote from the motor vehicle 10. The remote location 5 is shown here illustratively as a data center.

The control device 100 is also designed to cause the detection of an image by at least one of the image detection devices 110, 120, 130 within the time specification.

The control device 100 is also designed to send the detected image to a location 5 remote from the motor vehicle 10.

The control device 100 is also designed to receive an image from the location 5 remote from the motor vehicle 10.

The control device 100 is also designed to cause the received image to appear on the display device 150.

The control device 100 is also configured to receive user input on the display device 150 for selecting one of the plurality of image detection devices 110, 120, 130, the image detection being performed by the respectively selected image detection device.

The control device 100 is also designed to align an image region of the image detection device to be detected, both in response to a user input on the display device 150 and in response to a detected occupant position in the motor vehicle 10.

The control device 100 is also designed to detect a text input on the display device 150, wherein sending the detected image includes sending the detected text.

The control device 100 is also designed to detect contact data of an occupant 1, 2 of the motor vehicle 10, wherein the detected image is sent in response to the detected contact data.

The control device 100 is also designed to detect a position of the motor vehicle 10 and to send the detected position to the location 5 remote from the motor vehicle 10, wherein receiving a time specification and/or sending the detected image occurs in response to the detected position.

The control device 100 is also designed to detect whether the motor vehicle 10 is in an autonomous driving mode and to only execute the previously described functions when the motor vehicle 10 is not in an autonomous driving mode.

Overall, the examples show how a snapshot from a motor vehicle can be provided to other motor vehicles and/or devices.

In particular, these examples simplify social interaction by the occupants, especially the driver, and make it compliant with the law.

The invention claimed is:

1. A method for interaction with occupants of a motor vehicle, comprising:
   receiving a time specification from a location remote from the motor vehicle;
   detecting an image by an image detection device arranged on the motor vehicle, within the time specification, wherein the time specification is a time frame within which detecting the image by the image detection device must be carried out and otherwise leads to termination of the method;
   sending the detected image to the location remote from the motor vehicle;

receiving an image from the location remote from the motor vehicle; and displaying the received image on a display device in the motor vehicle.

2. The method according to claim 1, further comprising:

receiving a user input to select one of multiple image detection devices arranged on the motor vehicle, wherein the image is detected by the selected image detection device.

3. The method according to claim 1, further comprising:

aligning an image region to be detected of the selected image detection device.

4. The method according to claim 3, wherein aligning occurs in response to user input.

5. The method according to claim 3, further comprising:

detecting an occupant position in the motor vehicle, wherein the alignment takes place in response to the detected occupant position.

6. The method according to claim 1, further comprising:

detecting a text input, wherein sending the detected image comprises sending the detected text.

7. The method according to claim 1, further comprising:

detecting contact data of an occupant of the motor vehicle, wherein sending the detected image takes place in response to the detected contact data.

8. The method according to claim 1, further comprising:

detecting a position of the motor vehicle; and sending the detected position to the location remote from the motor vehicle, wherein receiving the time specification and/or sending the detected image takes place in response to the detected position.

9. The method according to claim 1, further comprising:

detecting whether the motor vehicle is in an autonomous driving mode, wherein the steps of the method are carried out in response to the fact that the motor vehicle is not in the autonomous driving mode.

10. A motor vehicle, comprising:

an image detection device configured to detect an image, and a control device configured to carry out the method according to claim 1.

11. The method according to claim 2, further comprising:

aligning an image region to be detected of the image detection device.

12. The method according to claim 4, further comprising:

detecting an occupant position in the motor vehicle, wherein the alignment takes place in response to the detected occupant position.

13. The method according to claim 2, further comprising:

detecting a text input, wherein sending the detected image comprises sending the detected text.

14. The method according to claim 3, further comprising:

detecting a text input, wherein sending the detected image comprises sending the detected text.

15. The method according to claim 4, further comprising:

detecting a text input, wherein sending the detected image comprises sending the detected text.

16. The method according to claim 5, further comprising:

detecting a text input, wherein sending the detected image comprises sending the detected text.

17. The method according to claim 2, further comprising:

detecting contact data of an occupant of the motor vehicle, wherein sending the detected image takes place in response to the detected contact data.

18. The method according to claim 3, further comprising:

detecting contact data of an occupant of the motor vehicle, wherein sending the detected image takes place in response to the detected contact data.

19. The method according to claim 4, further comprising:

detecting contact data of an occupant of the motor vehicle, wherein sending the detected image takes place in response to the detected contact data.

20. The method according to claim 5, further comprising:

detecting contact data of an occupant of the motor vehicle, wherein sending the detected image takes place in response to the detected contact data.

* * * * *